Dec. 31, 1929.  N. P. KRASNIKOV  1,741,523
PROCESS AND SLOT MEMBER FOR MANUFACTURING GLASS SHEETS
Filed Aug. 8, 1928

NICOLAI P. KRASNIKOV
INVENTOR
BY John P. Nikanow
ATTORNEY

Patented Dec. 31, 1929

1,741,523

UNITED STATES PATENT OFFICE

NICOLAI PAWLOWITSCH KRASNIKOV, OF MOSCOW, RUSSIA

PROCESS AND SLOT MEMBER FOR MANUFACTURING GLASS SHEETS

Application filed August 8, 1928, Serial No. 298,367, and in Germany February 1, 1927.

The invention relates to drawing glass in sheet form by aid of a slot member. In such processes it is known to provide hollow spaces for passing a cooling fluid along the slot, so as to harden the semi-liquid glass mass in passing the slot.

The invention consists therein that by temperature regulating fluids passed through the slot member the glass mass below the slot is brought to a precisely regulated and uniform temperature before entering the slot, the neighboured lateral parts of the glass mass being protected against said influence by heat insulations of the slot member. Hereby it is possible to use entirely metallic slot members of great durability, and crystallizations as well as any other undesired events are completely obviated, so that the quality of the glass sheet is essentially ameliorated and the whole process becomes very efficient and economic.

Further features of the invention consist in details of the slot member as later described.

In the drawing, the invention is illustrated on hand of a constructional sample of a slot member, of which Fig. 1 is a longitudinal vertical section taken on the line 1—1 (Fig. 2).

Figure 1:
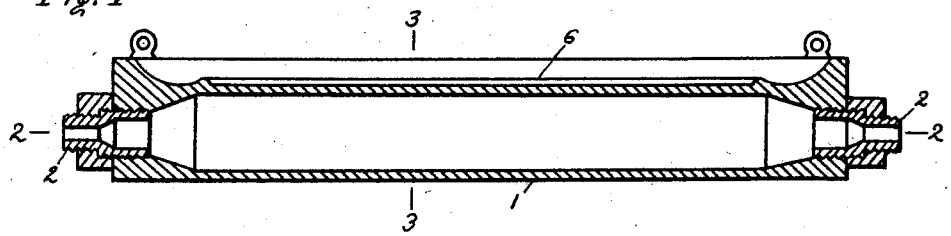
Figure 2:
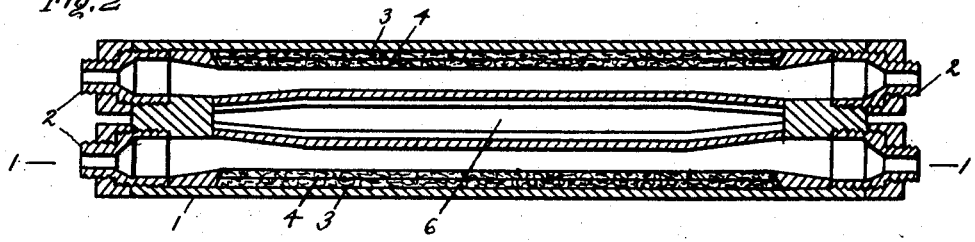
Fig. 2 is a horizontal section, and taken on the line 2—2 (Fig. 1).
Figure 3:
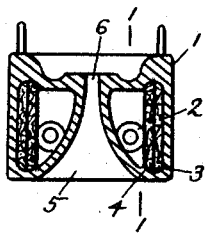
Fig. 3 is a vertical cross section taken on the line 3—3, (Fig. 1)
Figure 4:
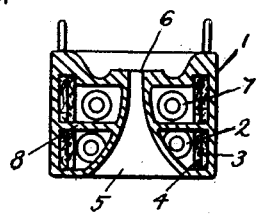
Fig. 4 is a vertical cross section of a modified construction.

A slot member 1 is manufactured of metal or a metal containing material with two separate longitudinal hollow spaces ending with tube fittings 2 which serve for introducing and exhausting some gaseous or liquid temperature regulating fluid, the amount of which may be regulated by any suitable means.

The outer walls of the slot member are lined inside by heat insulating liners 3 and 4, so that only the lower face and the faces of an enlarged glass entering space 5 and of the slot 6 are subjected to the cooling action of the fluids passed through the hollow spaces.

By this slot member it is possible to equalize and regulate the temperature of the glass mass already in the enlarged space 5, so that in entering the narrow slot 6 the glass mass is drawn to a very uniform sheet which by the cooling action of the walls of the slot becomes very quickly and uniformly hardened.

In order to obtain more accurate regulation, the hollow spaces may be subdivided into two or more separate longitudinal channels, for instance by a horizontal partition wall 8 on half height of the whole slot member. It is is then possible to separately regulate the surface temperatures on the enlarged space 5 and on the narrower slot 6, by passing for instance steam along the enlarged part 5 through pipes 2, and water or oil along the narrower slot 6, so that the glass mass in the entrance is brought to the exact temperature required and then cooled down in the slot more or less rapidly for producing a thicker or thinner sheet without the necessity of altering the slot size.

I claim:

1. A slot member for drawing glass sheets, comprising in combination inner walls confining a drawing slot and a lower enlarged entrance space, outer walls and an inner partition wall forming separate hollow spaces along said enlarged entrance space and along said slot, and fittings adapted to pass different temperature regulating fluids through said separate hollow spaces.

2. A process for manufacturing sheet glass, consisting in drawing melted glass through a slot member, and in circulating a plurality of different cooling fluids through different portions of said member, thereby maintaining correct operating temperatures at different portions of said slot member.

3. A slot member for drawing glass sheets, comprising a plurality of longitudinal chambers, said chambers being adapted to be cooled by different cooling fluids, and insulating members on the inside of the outer walls of said slot member, said insulating members being adapted to prevent said fluids from cooling the glass outside of said slot member.

In witness whereof I affix my signature.

NICOLAI PAWLOWITSCH KRASNIKOV.